2,861,349
SAW FILING GAUGE

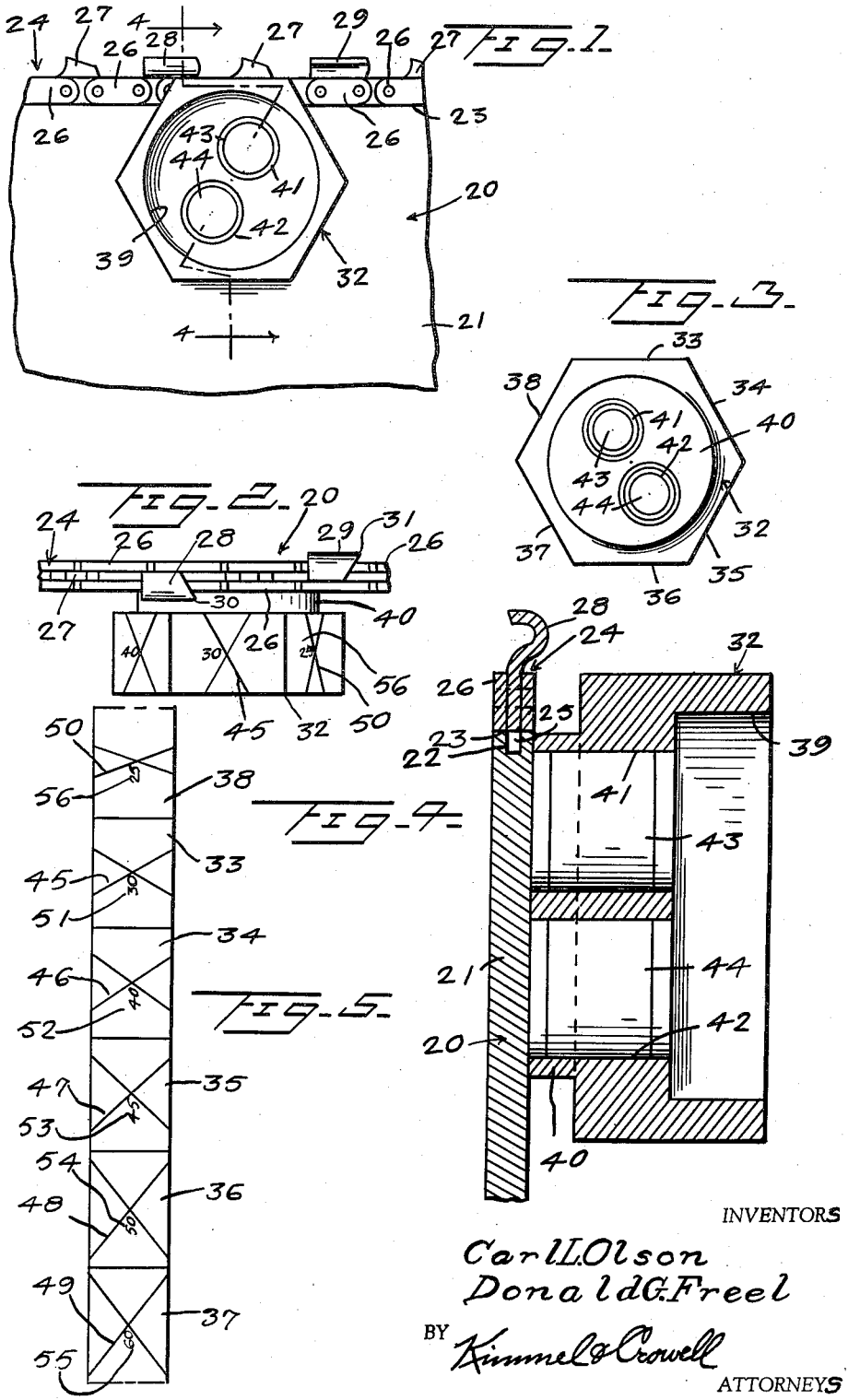

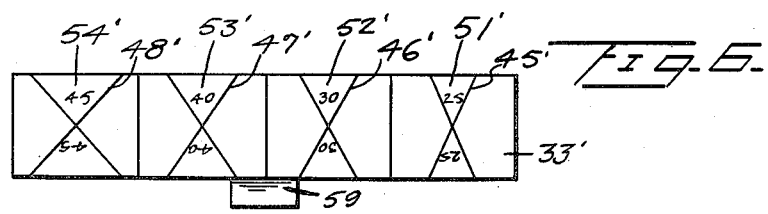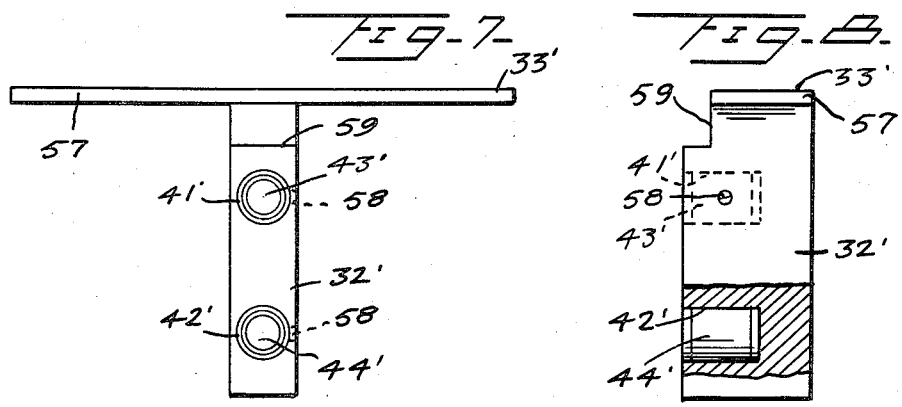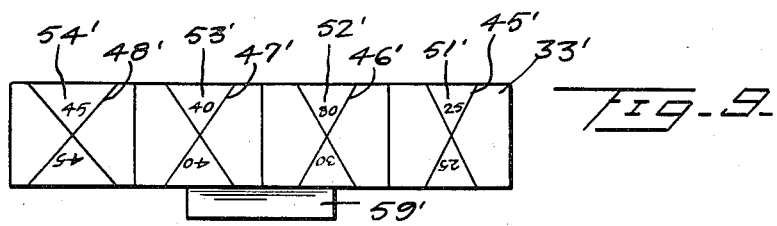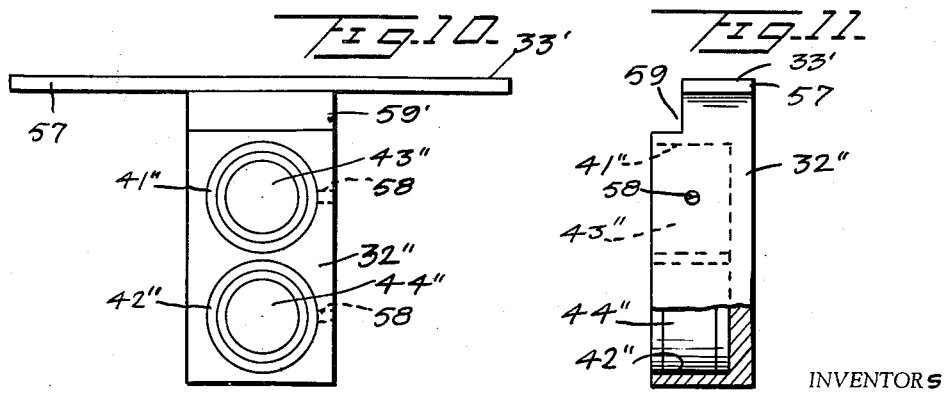

Carl L. Olson, Grants Pass, and Donald G. Freel, Salem, Oreg.

Application March 19, 1956, Serial No. 572,481

1 Claim. (Cl. 33—202)

The present invention relates to saw filing gauges, and more particularly to such gauges which can be utilized to assist in the accurate filing of chain saws.

The primary object of the invention is to provide a gauge useful in establishing and maintaining the filing angle of saw teeth without necessitating the mounting of the saw in a jig or vise.

Another object of the invention is to provide a saw filing gauge of the class described which may be utilized with saws having teeth sharpened at several different angles.

A further object of the invention is to provide a saw filing gauge which is light in weight, portable, and which can be carried from place to place readily to permit the saws to be sharpened on the job.

A still further object of the invention is to provide a saw sharpening gauge of the character described above which will be inexpensive to manufacture, easy to carry and store, and extremely simple to use.

Other objects and advantages will become apparent in the following specification when considered in the light of the attached drawings, in which:

Figure 1 is a fragmentary side elevation of the invention shown attached to a chain saw.

Figure 2 is a top plan view of the device illustrated in Figure 1.

Figure 3 is a side elevation of the invention illustrating the side opposite to that shown in Figure 1.

Figure 4 is an enlarged fragmentary vertical cross-section taken along the line 4—4 of Figure 1, looking in the direction indicated.

Figure 5 is a diagrammatic view of each of the faces illustrating their relationship to each other.

Figure 6 is a top plan view of a modified form of the invention.

Figure 7 is a side elevation of the modification illustrated in Figure 6.

Figure 8 is an end elevation, partially broken away and in section, of the invention illustrated in Figure 6.

Figure 9 is a top plan view of a second modified form of the invention.

Figure 10 is a side elevation of the invention illustrated in Figure 9.

Figure 11 is an end elevation, partially broken away and in section, of the invention illustrated in Figure 9.

Referring now to the drawings in detail wherein like reference numerals indicate like parts throughout the several figures, the reference numeral 20 indicates generally a chain saw of the type with which the invention is adapted to be used. The chain saw 20 consists of a metallic blade like member 21 having a peripheral groove 22 formed in its narrow edge 23. A chain saw generally indicated at 24 is mounted on the narrow edge 23 of the blade 21 and has a portion 25 thereof extending into the groove 22 to maintain the saw 24 in guided relation on the narrow edge 23 of the blade 21.

The chain saw 24 consists of a plurality of links 26 to which are attached raker teeth 27 and oppositely extending cutter teeth 28 and 29. The cutter teeth 28 and 29 have their leading edges 30 and 31, respectively, bevelled to provide a sharp cutting edge. The angle formed on the leading edges 30 and 31 of the cutter teeth 28 and 29 will vary according to the manufacturer of the saw and according to the use to which the saw is put. At the present time chain saws are sharpened by removing the saw chain from the blade and mounting it in a jig where it is sharpened by a power driven file. Due to the necessity of maintaining the angle when sharpening the saw it has been virtually impossible to sharpen or dress the cutting edge on the job without removing the chain from the saw blade.

The present invention consists of a gauge for guiding the eye of the saw filer to permit him to dress or sharpen the teeth without removing the chain saw from the blade.

A body generally indicated at 32 has a hexagonal form with flat surfaces 33, 34, 35, 36, 37 and 38. The body 32 is provided with an axial bore 39 extending inwardly from one side edge thereof. A cylindrical boss 40 extends laterally from the body 32 in axial alignment with the bore 39. The boss 40 extends a substantial distance laterally beyond the body 32. A pair of bores 41 and 42 extend through the body 32 and the boss 40 from the base of the bore 39. The bores 41 and 42 are equispaced on opposite sides of the axis of the body 32 and have their axes extending parallel thereto.

A pair of magnets 43 and 44 are press-fitted into the bores 41 and 42, respectively, as illustrated in Figure 4.

Referring now to Figure 5 it should be noted that each of the flat surfaces 33, 34, 35, 36, 37 and 38 are provided with guide lines 45, 46, 47, 48, 49 and 50, respectively, extending thereacross at differing angles indicated by indicia 51, 52, 53, 54, 55 and 56, respectively.

In the use and operation of the invention illustrated in Figures 1 through 5, the body 32 is placed adjacent the blade 21 of the chain saw 20 with the boss 40 and the magnets 43 and 44 in contact with the face of the blade 21. One flat surface, such as 33, is positioned uppermost with the guide lines 45 thereof in alignment with the leading edge 30 or 31 of one of the cutter teeth 28 and 29. The tooth 28 or 29 is then sharpened with a file (not shown) which is held so as to remain in alignment with the guide lines 45 during the filing operation. As each tooth 28 or 29 is sharpened either the body 32 or the chain saw 24 is moved so as to align an unsharpened tooth 28 or 29 with the guide lines 45.

Obviously, the body 32 can be rotated to vary the sharpening angle when conditions require. It should be noted that the dual magnets not only serve to secure the body 32 to the blade 21 during the filing operation, but also effectively prevent rotation of the body 32 about its own axis when the blade 21 is vibrated during the filing operation.

Referring now to the modification disclosed in Figures 6, 7 and 8,, a generally rectangular vertically elongated body 32' is provided at its upper end with a flat plate 57 which is secured thereto by any suitable means so as to extend equally on opposite sides of the body 32' so that the plate 57 and the body 32' will have a general T-shaped configuration. The plate 57 is provided with an upper flat surface 33' having guide line sets 45', 46', 47' and 48' inscribed therein and suitably identified by indicia 51', 52', 53' and 54'.

The elongated body 32' is offset at 59 as best illustrated in Figure 8, to maintain the plate 57 in spaced relation to the work. The body 32' is provided with spaced parallel bores 41' and 42'. Cylindrical magnets 43' and 44' are positioned within the bores 41' and 42' and secured therein by means of set screws 58 extending through the body 32', or in any other suitable manner.

The use and operation of the modification illustrated in Figures 5, 7 and 8 is identical to that for the preferred form with the exception that there is no necessity to rotate the body 32' for changing the angle of filing of the tooth.

The modification illustrated in Figures 9, 10 and 11 is very similar to the modification illustrated in Figures 6, 7 and 8 with the exception that the body 32'' is substantially wider than the body 32'. This construction permits the bores 41'' and 42'' to be made substantially larger than the bores 41' and 42' so that substantially larger magnets 43'' and 44'' can be utilized. The operation of this form of the invention is identical to that set forth for Figures 6 through 8 with this modification having the advantage that the substantially larger magnets 43'' and 44'' will provide a much more substantial grip maintaining the implement in more positive engagement with the blade 21 during the filing operation.

Having thus described the preferred embodiments of the invention, it should be understood that other modifications and structural adaptations may be resorted to without departing from the scope of the appended claim.

What is claimed is:

A saw filing gauge comprising a hexagonal body having an axial bore extending partially therethrough from one side thereof, a cylindrical boss projecting integrally from the side of said body opposite said bore, said hexagonal body having a plurality of outer flat faces formed thereon, said flat faces having a plurality of saw filing guide lines inscribed thereon with indicia adjacent each of said guide lines for identifying the angle thereof, said body having a pair of bores formed therein with their axes equispaced from and parallel to the axis of said body and extending from the base of said axial bore through the remainder of said body and through said boss, and magnets mounted in said pair of bores.

References Cited in the file of this patent

UNITED STATES PATENTS

| | | |
|---|---|---|
| 804,067 | Stowe | Nov. 7, 1905 |
| 1,226,068 | Faas | May 15, 1917 |
| 1,514,916 | Leatherman | Nov. 11, 1924 |
| 1,732,906 | Morton | Oct. 22, 1929 |
| 2,280,437 | Levesque | Apr. 21, 1942 |
| 2,543,192 | Nelson | Feb. 27, 1951 |
| 2,666,352 | Philips | Jan. 19, 1954 |

FOREIGN PATENTS

| | | |
|---|---|---|
| 533,186 | Germany | Sept. 26, 1931 |